United States Patent
Oshige (10) Patent No.: US 11,140,323 B2
(45) Date of Patent: Oct. 5, 2021

(54) ELECTRONIC VIEWFINDER AND IMAGE CAPTURING APPARATUS

(71) Applicant: CANON KABUSHIKI KAISHA, Tokyo (JP)

(72) Inventor: Hidemasa Oshige, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 16/848,995

(22) Filed: Apr. 15, 2020

(65) Prior Publication Data

US 2020/0344419 A1   Oct. 29, 2020

(30) Foreign Application Priority Data

Apr. 25, 2019 (JP) .............................. JP2019-084432

(51) Int. Cl.
*H04N 5/232* (2006.01)
*H04N 5/225* (2006.01)

(52) U.S. Cl.
CPC ....... *H04N 5/23293* (2013.01); *H04N 5/2252* (2013.01); *H04N 5/2254* (2013.01)

(58) Field of Classification Search
CPC ........... H04N 5/23293; H04N 5/22525; H04N 5/2252; H04N 5/22521; H04N 5/2251; H04N 5/2254; G03B 2213/00; G03B 2213/02; G03B 13/02; G03B 13/00; G03B 13/06; G03B 13/10; A61B 3/14
See application file for complete search history.

(56) References Cited

U.S. PATENT DOCUMENTS

| | | | | |
|---|---|---|---|---|
| 5,517,278 A | * | 5/1996 | Takahara | ........... H04N 5/22525 396/374 |
| 2010/0091375 A1 | | 4/2010 | Suzuki | |
| 2010/0104272 A1 | * | 4/2010 | Ogino | ................. G02B 25/001 396/374 |
| 2010/0208108 A1 | * | 8/2010 | Nakahira | ......... H04N 5/232411 348/248 |
| 2019/0107767 A1 | * | 4/2019 | Adachi | .................. G03B 17/04 |
| 2020/0012020 A1 | | 1/2020 | Oshige | |

FOREIGN PATENT DOCUMENTS

| | | |
|---|---|---|
| JP | S61-140335 U | 8/1986 |
| JP | H07-064153 A | 3/1995 |
| JP | 2002-267948 A | 9/2002 |
| JP | 2003-228097 A | 8/2003 |
| JP | 2004-212792 A | 7/2004 |
| JP | 2009-251419 A | 10/2009 |
| JP | 2017-068181 A | 4/2017 |

* cited by examiner

*Primary Examiner* — Sinh Tran
*Assistant Examiner* — Zhenzhen Wu
(74) *Attorney, Agent, or Firm* — Venable LLP (57) ABSTRACT

A viewfinder comprising a display device which comprises a surface including a display portion and a peripheral portion, a lens and a housing is provided. In an orthogonal projection with respect to the surface, the housing comprises an overlap portion and a shielding portion that overlap at least a part of the peripheral portion, respectively. A distance between the peripheral portion and the shielding portion is larger than a distance between the peripheral portion and the overlap portion. A light beam emitted from an end of the display portion which has an angle less than a predetermined angle from a normal of the surface enters the lens, and a light beam emitted from the end which has an angle not less than the predetermined angle from the normal of the surface and is reflected by the overlap portion enters the shielding portion.

19 Claims, 4 Drawing Sheets

ELECTRONIC VIEWFINDER AND IMAGE CAPTURING APPARATUS

BACKGROUND OF THE INVENTION

Field of the Invention

The present invention relates to an electronic viewfinder and an image capturing apparatus.

Description of the Related Art

An electronic viewfinder that is mounted on an image capturing apparatus includes an eyepiece optical system and a display module which includes a display device using a liquid crystal element, an organic electroluminescent element, or the like. The display module includes an enclosure member that is arranged so as to surround a display surface, for displaying an image on the display device, in a space between the display device and the eyepiece optical system to suppress dust from attaching to the display surface. In a peripheral portion positioned around the display portion for displaying the image on the display surface, the enclosure member may be provided with an overlap portion that can function as a mask which is arranged so as to overlap the peripheral portion and suppress reflection of external light. Japanese Patent Laid-Open No. 2009-251419 discloses that a spacer that covers the periphery of an image display surface is arranged between the image display surface and a translucent plate which transmits light emitted from the image display surface.

SUMMARY OF THE INVENTION

If display light emitted from a display surface is reflected by an inner edge of the overlap portion, the inner edge of the overlap portion will be visually recognized, and the display quality will degrade.

Some embodiments of the present invention provide a technique advantageous in improving the display quality of an electronic viewfinder.

According to some embodiments, an electronic viewfinder comprising a display device which comprises a first surface including a display portion and a peripheral portion positioned surrounding the display portion, a lens facing the first surface, and a housing surrounding a space between the display device and the lens, wherein the housing comprises an overlap portion that overlaps at least a part of the peripheral portion in an orthogonal projection with respect to the first surface, and an inner edge of the overlap portion includes, in the orthogonal projection with respect to the first surface, a second surface arranged along a direction intersecting the first surface and a first side formed by the second surface and a third surface, of the overlap portion, on a side opposite to a surface facing the first surface, and the housing comprises a light shielding portion that overlaps at least a part of the peripheral portion in the orthogonal projection with respect to the first surface, a distance between the peripheral portion and the light shielding portion is larger than a distance between the peripheral portion and the overlap portion, and a light beam, of light beams emitted from an end of the display portion, which has an angle less than a predetermined angle from a normal of the first surface enters the lens without entering the overlap portion, and a light beam, of the light beams emitted from the end of the display portion, which has an angle not less than the predetermined angle from the normal of the first surface and is reflected by the overlap portion enters the light shielding portion, is provided.

According to some other embodiments, an electronic viewfinder comprising a display device which comprises a first surface including a display portion and a peripheral portion positioned surrounding the display portion and a protection layer arranged so as to cover the first surface, a lens facing the first surface, and a housing surrounding a space between the display device and the lens, wherein the housing comprises an overlap portion that overlaps at least a part of the peripheral portion in an orthogonal projection with respect to the first surface, and an inner edge of the overlap portion includes, in the orthogonal projection with respect to the first surface, a second surface arranged along a direction intersecting the first surface and a first side formed by the second surface and a third surface, of the overlap portion, on a side opposite to a surface facing the first surface, and the housing comprises a light shielding portion that overlaps at least a part of the peripheral portion in the orthogonal projection with respect to the first surface, a distance between the peripheral portion and the light shielding portion is larger than a distance between the peripheral portion and the overlap portion, and $X \geq Y1 \tan\{90-\arctan(H/L)\} + Y2 \tan[\arcsin[\sin\{90-\arctan(H/L)\}/n]]$ where $X$ [mm] is a length from an outer edge of the display portion to the first side in the orthogonal projection with respect to the first surface, and $L$ [mm] is a length from the first side to a second side which is arranged at a position, on the inner edge of the light shielding portion, facing the first side via the center of the display portion, and $Y1$ [mm] is a length from a surface on a side opposite to a surface facing the first surface of the protection layer to the first side, $Y2$ [mm] is a thickness of the protection layer, and $H$ [mm] is a length from the first side to the second side, in a normal direction with respect to the first surface, and $n$ is a refractive index of the protection layer, is provided.

Further features of the present invention will become apparent from the following description of exemplary embodiments (with reference to the attached drawings

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Figure 1A:
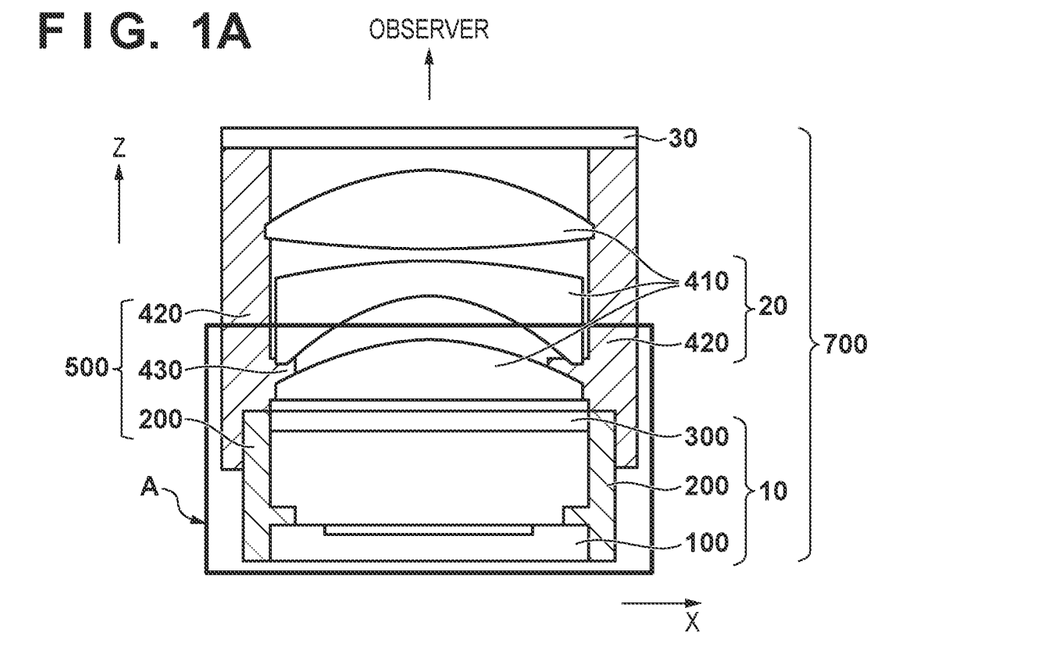
FIGS. 1A and 1B are sectional views showing an example of the arrangement of an electronic viewfinder according to the embodiment.

An electronic viewfinder according to an embodiment of the present invention will be described with reference to FIGS. 1A to 5. FIG. 1A is a schematic sectional view showing the structure of an electronic viewfinder 700 according to the present invention. The schematic arrangement of the electronic viewfinder 700 will be described first.

Figure 1B:
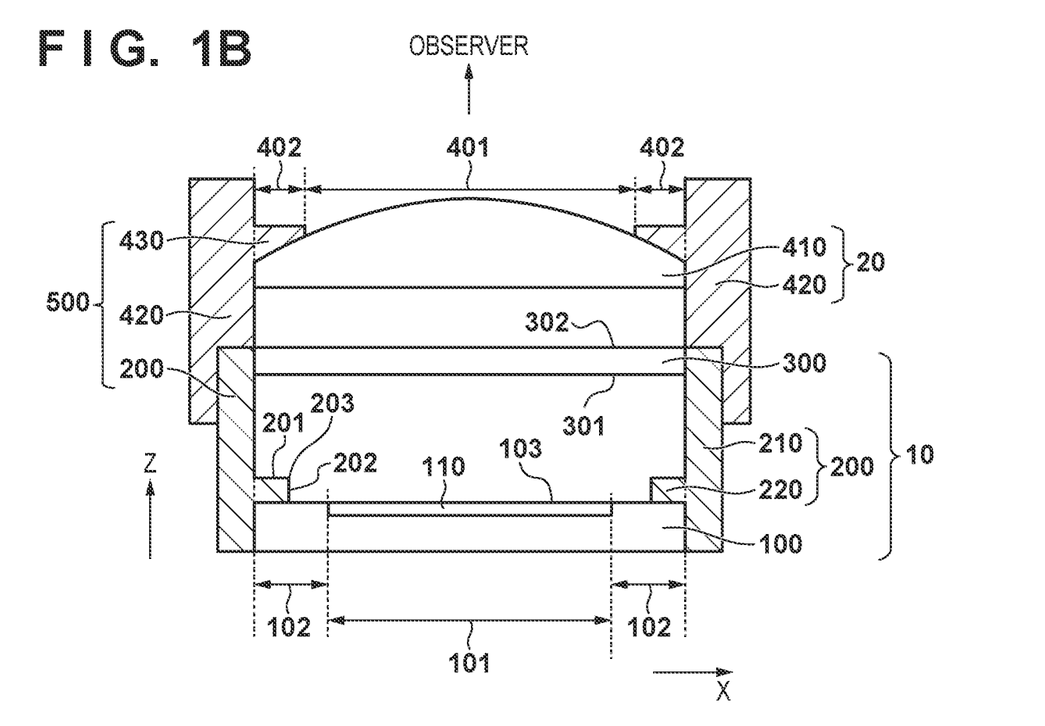

The electronic viewfinder 700 includes a display module 10, an eyepiece optical system 20, and a cover member 30 as shown in FIG. 1A. An observer observes, through the cover member 30, a display image enlarged by the eyepiece optical system 20 and generated by the display module 10. FIG. 1B shows an enlarged view of a portion indicated by a region A in FIG. 1A. As shown in FIG. 1B, the display module 10 includes a display device 100 and an enclosure member 200 and a light transmitting member 300 which are arranged in a space between the display device 100 and the eyepiece optical system 20. The enclosure member 200 and the lens barrel member 420 of the eyepiece optical system 20 (to be described later) form a housing 500 of the electronic viewfinder 700. The housing 500 surrounds the space between the display device 100 and lenses 410 of the eyepiece optical system 20.

The display device 100 includes a main surface 103 which includes a display portion 101 arranged with a display element 110 and a peripheral portion 102 positioned to surround the display portion. In the display device 100, the display element 110 such as a liquid crystal element or an organic electroluminescent element is arranged on the main surface 103 made of a base material such as silicon or glass. In addition to the display portion 101, a transistor for driving the display element 110, a wiring pattern for supplying electric power to the display element 110, and the like are provided on the display portion 101. The typical shape of the display portion 101 is a quadrilateral in an orthogonal projection with respect to the main surface 103, and a dimension (diagonal length) of the display portion 101 in such a case is, for example, 2.54 mm to 25.4 mm (0.1 in to 1.0 in) and is, for example, 5 mm to 20 mm. A wiring pattern, a circuit for driving the display element 110, an external connection terminal for electrically connecting to the outside of the display module 10, and the like are arranged in the peripheral portion 102. The external connection terminal and a wiring substrate (not shown) that electrically connects to the outside of the display module 10 are joined via a joining member (not shown) such as a bump, anisotropic conductive resin, or the like. A light transmitting member that is made of glass or the like may be arranged, as needed, on the display device 100 at regions other than each connecting portion with the wiring substrate.

The enclosure member 200 of the housing 500 includes a side wall portion 210, which is arranged along a z direction (a linear direction parallel to the normal of the main surface 103, and to be sometimes referred to as a normal direction hereinafter) perpendicular to the main surface 103, so that one end will surround the outer edge of the main surface 103 of display device 100 to suppress the adherence of dust to the main surface 103 including the display portion 101 for displaying an image. In addition, the enclosure member 200 of the housing 500 includes, in an orthogonal projection with respect to the main surface 103 of the display device 100, an overlap portion 220 that protrudes from the side wall portion 210 so as to be arranged at a position which overlaps at least a part of the peripheral portion 102. As shown in FIG. 1B, the side wall portion 210 can be arranged outside the outer edge of the display device 100 in an orthogonal projection with respect to the main surface 103 of the display device 100. However, the present invention is not limited to this, and the side wall portion 210 may cover a part of the display device 100. In contrast, the overlap portion 220 protrudes, from a part of the side wall portion 210 in a direction (to be referred to as an x direction hereinafter) intersecting the z direction, so as to cover a part of the display device 100. The x direction can be parallel to the main surface 103 of the display device 100. The x direction can also be perpendicular to the z direction.

The side wall portion 210 and the overlap portion 220 may be integrally formed from the same material. The side wall portion 210 and the overlap portion 220 may also be formed separately and joined together by using a joining member such as an adhesive. In a case in which a wiring substrate such as a flexible printed circuit (FPC) has been joined to the peripheral portion 102 of the display device 100, the wiring substrate may form a step in the peripheral portion 102. In order to eliminate the step formed by this wiring substrate, a counter bore portion (concave portion) may be arranged in the enclosure member 200 so that the main surface 103 of the display device 100 will be in contact with the overlap portion 220. The enclosure member 200 can be formed from a thermoplastic resin such as polyethylene terephthalate (PET), modified polyphenylene ether (PPE), a liquid crystal polymer (LCP), or the like. A filler such as glass fiber may be added to the material of the resin to improve the mechanical strength of the enclosure member 200. In addition, to prevent the degradation of the display quality of the electronic viewfinder 700 due to light emitted from the display element 110 and external light being reflected by the surface of the enclosure member 200, a black pigment or the like can be added to the resin forming the enclosure member 200. The overlap portion 220 can function as a mask for suppressing external light reflection in the peripheral portion 102. In the arrangement disclosed in Japanese Patent Laid-Open No. 2009-251419, there is a possibility that display quality degradation such as contrast degradation will occur because the external light that enters from outside the electronic viewfinder through the eyepiece optical system will be reflected to the side of the display portion by the inclined surface of a spacer. Hence, an upper surface 201, of the overlap portion 220, on a side opposite to the surface facing the display device 100 may be almost parallel to the main surface 103 of the display device 100. As a result, the external light hits the upper surface 201 and is reflected to the side of the display portion 101, and display quality degradation such as contrast degradation can be suppressed. The overlap portion 220 also performs the role of a positioning member which determines the position and the height of the enclosure member 200 with respect to the display device 100. The height of the enclosure member 200 and that of the display device 100 can be uniquely determined by arranging at least a part of the overlap portion 220 so that it will be in contact with the main surface 103 of the display device 100.

The light transmitting member 300 is arranged, so as to cover the main surface 103 of the display device 100, on an end, of the enclosure member 200, on a side opposite to the side of the main surface 103 of the display device 100 in the z direction. The light transmitting member 300 includes a lower surface 301 which faces the main surface 103 of the display device 100 and an upper surface 302 which is on a side opposite to the lower surface 301 and faces the eyepiece optical system. The light transmitting member 300 can be made of glass or plastic such as acrylic. The light transmitting member 300 and the enclosure member 200 that surrounds the periphery of the display device 100 suppress dust and dirt from attaching to the display portion 101 of the display device 100. Also, as shown in FIG. 1B, in this embodiment, the display device 100 is arranged at one end of the enclosure member 200 in the z direction and the light transmitting member 300 is arranged on the other end. Hence, in this embodiment, the enclosure member 200 is arranged between the display device 100 and the light transmitting member 300.

The eyepiece optical system 20 enlarges the image displayed on the display portion 101 of the display device 100. The eyepiece optical system 20 can be a unit which uses the lens barrel member 420 to integrate the plurality of lenses 410. A mechanism that adjusts the diopter in accordance with the observer's eyesight by moving the eyepiece optical system 20 in the z direction serving as the optical-axis direction to change the interval of the eyepiece optical system 20 with respect to the display device 100 may be provided. The enclosure member 200 and the lens barrel member 420 that form the housing 500 of the electronic viewfinder 700 can be formed separately and be joined together, as shown in FIG. 1A, by using a joining member such as an adhesive. However, the present invention is not limited to this, and the enclosure member 200 and the lens barrel member 420 forming the housing 500 may be formed integrally.

The cover member 30 is arranged to prevent damage to the lenses 410 and to improve the dust-proof and drip-proof performance of the electronic viewfinder 700. The cover member 30 may be arranged as an eyepiece portion. Also, it is possible to arrange, on the cover member 30, an external light suppressing member formed by using rubber or plastic to suppress the entry of excess external light from the eyepiece portion which is called an eyecup, and the external light suppressing member can function as the eyepiece portion.

The manufacturing method of the electronic viewfinder 700 according to the embodiment will be described next. A case using an organic electroluminescent display element as the display element 110 will be described here. That is, a case in which the display device 100 is an organic electroluminescent display device will be described.

First, a semiconductor element such as a transistor, a capacitor, or the like for driving the display element 110 is formed on the side of the main surface 103 of the substrate using a semiconductor such as silicon. An insulating layer, a wiring pattern layer, and the like are sequentially formed on the semiconductor element, and an external connection terminal and the like are formed simultaneously on the peripheral portion 102 outside the display portion 101 of the substrate. Next, a pixel electrode electrically connected to the wiring pattern through a via provided on the insulating layer is arranged for each pixel. Each pixel electrode is formed on the display portion 101 of the main surface 103 of the substrate. A white organic electroluminescent light-emitting layer is formed on the pixel electrodes, and a transparent electrode, a sealing layer, and a color filter are stacked and formed on the organic electroluminescent light-emitting layer in that order. Subsequently, the display device 100 can be completed when a flexible printed circuit board (FPC) for electrically connecting the display device 100 to an external power supply is joined, via an anisotropic conductive resin, to the external connection terminal arranged in the display device 100.

The enclosure member 200 is formed by using, for example, an injection molding method. In this embodiment, the side wall portion 210 and the overlap portion 220 of the enclosure member 200 are integrally molded by using a liquid crystal polymer as the resin for forming the enclosure member 200. For example, a resin temperature of 350° C., a mold temperature of 130° C., and an injection pressure of 100 MPa can be set as the molding conditions.

Next, the main surface 103 of the display device 100 is covered by the enclosure member 200, and the main surface 103 of the display device 100 and the overlap portion 220 of the enclosure member 200 are made to contact each other. Subsequently, an epoxy-based adhesive is injected to the gap between the display device 100 and the enclosure member 200 to join the display device 100 and the enclosure member 200. Next, on the end, of the enclosure member 200, which is the side opposite to the end where the display device 100 is arranged, a glass substrate is installed as the light transmitting member 300 and adhered, by using an epoxy-based adhesive, so as to face the main surface 103 of the display device 100. Both the surface 301 and the surface 302 or one of the surface 301 and the surface 302 of the light transmitting member 300 may be covered by an anti-reflection film. The reflection of the display light can be suppressed by forming an anti-reflection film on at least one of the surface 301 and the surface 302. The display module 10 is completed by undergoing the processes described above.

Next, the eyepiece optical system 20 is installed on the display module 10. Here, in this specification, an "upward" direction indicates the direction of an arrow in the z direction shown in FIGS. 1A and 1B. Hence, in this specification, it can be expressed that the eyepiece optical system 20 is arranged "upward" above the display module 10. In this embodiment, the eyepiece optical system 20 is formed by combining three lenses 410 which are arranged to overlap the display portion 101 of the display device 100. However, the number of lenses 410 arranged in the eyepiece optical system 20 is not limited to three and may be two or less or four or more. An appropriate number of lenses can be selected in accordance with the desired performance of the eyepiece optical system 20. The eyepiece optical system 20 includes the plurality of lenses 410 and the lens barrel member 420 for holding the plurality of lenses 410. In this embodiment, the lens barrel member 420 forming the housing 500 includes a light shielding portion 430 which overlaps at least a part of the peripheral portion 102 in an orthogonal projection with respect to the main surface 103 of the display device 100. Hence, each lens 410 of the eyepiece optical system 20 includes a portion 401 which transmits a display image from the display module 10 and a portion 402 which overlaps the light shielding portion 430 and does not transmit the display image. The light shielding portion 430 may be formed integrally with the lens barrel member 420 as shown in FIGS. 1A and 1B or formed separately from the lens barrel member. In addition, in this embodiment, height adjustment with the display module 10 is performed so that the distance from the main surface 103 of the display device 100 to the eyepiece optical system 20 in the z direction will be almost equal to the focal length of the eyepiece optical system 20. In this case, as shown in FIG. 1A, the light shielding portion 430 may be arranged near the lens 410, of the plurality of lenses 410, which is arranged at a position closest to the main surface 103 of the display device 100. Also, as shown in FIG. 1B, the light shielding portion 430 may be arranged so as to be in contact with the upper surface, on a side opposite to a lower surface facing the main surface 103, of the lens 410 which is arranged at a position closest to the main surface of the 103 of the display device 100. In this case, the lens 410 may be held by the light shielding portion 430. The light shielding portion 430 can be arranged so as to cover the outer edge of the lens 410 as shown in FIGS. 1A and 1B.

In addition, the arrangement of the light shielding portion 430 is not limited to the position (height) where the lens barrel member 420 is arranged. In a range that satisfies a positional relationship (to be described later), the light shielding portion 430 may be formed integrally with the enclosure member 200 or the light shielding portion 430 may be formed separately and attached to the enclosure member 200. That is, it can be said that the light shielding portion 430 is included in the housing 500, which is formed by the enclosure member 200 and the lens barrel member 420. The light shielding portion 430 can be arranged at an appropriate position (height) in accordance with the shapes of the enclosure member 200 and the lens barrel member 420 forming the housing 500. In this case, as shown in FIGS. 1A and 1B, the housing 500 includes, in an orthogonal projection with respect to the main surface 103 of the display device 100, the light shielding portion 430 and the overlap portion 220 which are arranged so as to overlap the peripheral portion 102. Although both the overlap portion 220 and the light shielding portion 430 protrude from the housing 500 so as to partially cover the display device 100, it is possible to discriminate these portions since, for example, the distance between the peripheral portion 102 and the light shielding portion 430 is greater than the distance between the peripheral portion 102 and the overlap portion 220.

Next, by installing the cover member 30 which transmits light and protects the lenses 410 above the eyepiece optical system 20, the electronic viewfinder 700 according to this embodiment shown in FIG. 1A is completed. In this embodiment, the cover member 30 is supported above the display module 10 by the lens barrel member 420 forming the eyepiece optical system 20. However, the present invention is not limited to this, and the lenses 410 and the cover member 30 may be supported by the side wall portion 210 of the enclosure member 200 of the display module 10 or the like. In other words, the lenses 410 and the cover member 30 are supported by the housing 500 including the enclosure member 200 and the lens barrel member 420.

Figure 2A:
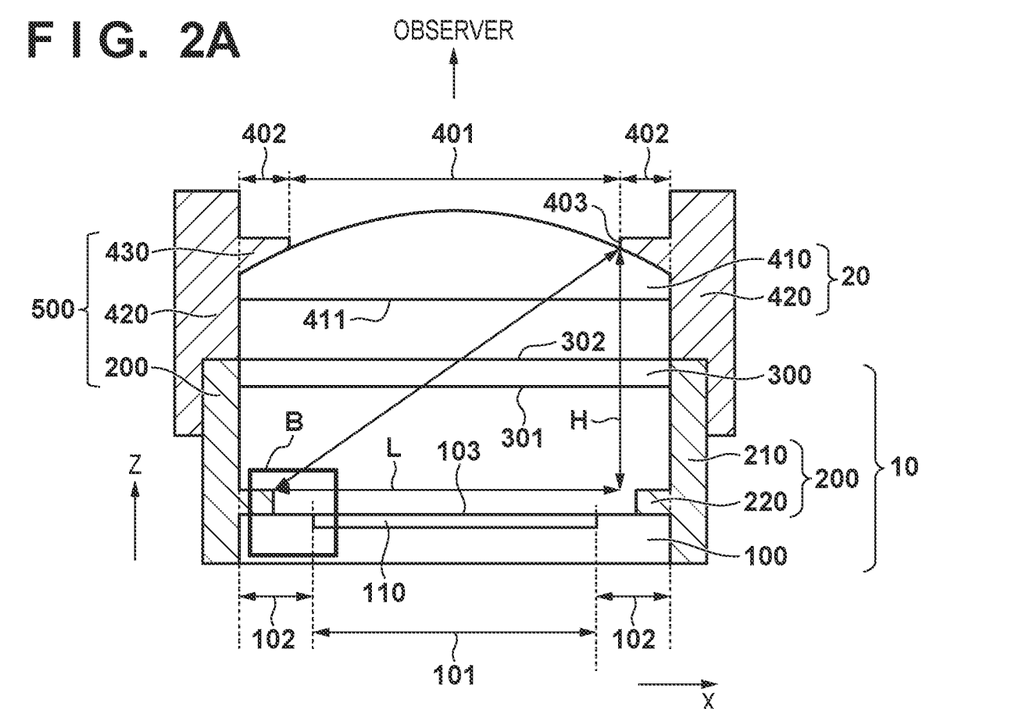
FIGS. 2A and 2B are views for explaining a light beam of display light of the electronic viewfinder shown in FIGS. 1A and 1B.
Figure 2B:
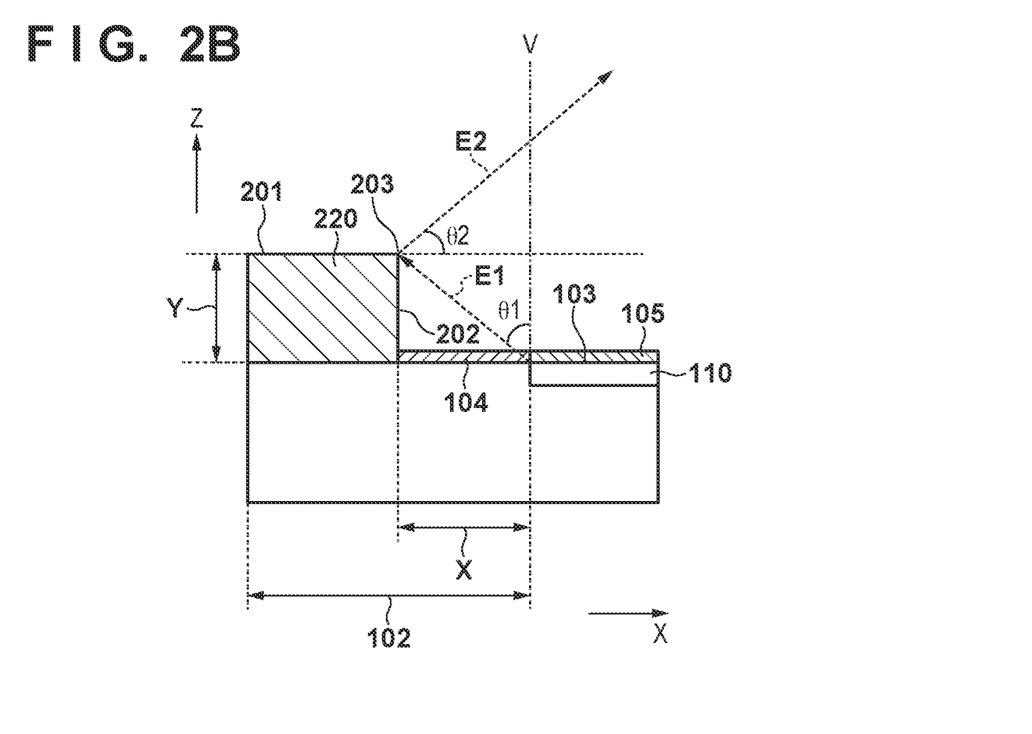

The positional relationship between the overlap portion 220 of the enclosure member 200 of the housing 500 and the light shielding portion 430 (portion 402) which is between the display portion 101 and the lens barrel member 420 of the housing 500 according to this embodiment will be described with reference to FIGS. 2A and 2B. FIG. 2A is a schematic view in which an emitted light beam from the end of the display portion 101 shown in FIG. 1B is reflected by a side 203 of the overlap portion 220. FIG. 2B is an enlarged view of a region B shown in FIG. 2A. In this case, the side 203 is a side arranged on an inner edge of the overlap portion 220 in an orthogonal projection with respect to the main surface 103 of the display device 100. The inner edge of the overlap portion 220 is a portion, of the overlap portion 220, which is closest to the center of the display portion 101 in an orthogonal projection with respect to the main surface 103 of the display device 100. Hence, the side 203 can be, among the sides (for example, not in contact with the main surface 103) of the overlap portion 220 positioned apart from the main surface 103 of the display device 100 in the z direction, a side closest to the center of the display portion 101 in an orthogonal projection with respect to the main surface 103 of the display device 100. More specifically, the side 203 is formed by a side surface 202, of the overlap portion 220, which is arranged in a direction intersecting the main surface 103 of the display device 100, and the upper surface 201, of the overlap portion 220, which is on a side opposite to the lower surface facing the main surface 103 of the display device 100. The side 203 can be the side, of the overlap portion 220, which is closest to the center of the display portion 101 in an orthogonal projection with respect to the main surface 103 of the display device 100. The side surface 202 can be the surface, of the overlap portion 220, which is closest to the center of the display portion 101 in an orthogonal projection with respect to the main surface 103 of the display device 100. The side surface 202 of the overlap portion 220 may be parallel to the normal direction (z direction) with respect to the main surface 103 of the display device 100. The side surface 202 of the overlap portion 220 may also have a reverse tapered structure that becomes closer to the center of the display portion 101 as the distance increases from the main surface 103 of the display device 100. In addition, consider a case in which the side surface 202 of the overlap portion 220 has a tapered structure that recedes from the center of the display portion 101 as the distance from the main surface 103 of the display device 100 increases. In this case, the side 203 can be the side, of the sides formed by the upper surface 201 and the side surface 202 of the overlap portion 220, which is closest to the display portion 101 in an orthogonal projection with respect to the main surface 103 of the display device 100.

In the display device 100, a sealing layer, a color filter, or the like may be arranged on the display element 110 in practice. However, since the film thickness of a sealing layer or a color filter is about a few μm, assume that the influence of the refraction on the interlayer surface can be ignored here. Also, as described above, assume that an anti-reflection film is provided on both surfaces of the light transmitting member 300 and that the refraction on the surface 301 and the surface 302 of the light transmitting member 300 can be ignored. In addition, since the thickness of the lens 410, closest to the display module, with respect to the distance from the overlap portion 220 to a lower surface 411 of the lens 410 in the z direction is sufficiently small, assume that the refraction on the lower surface 411 of the lens 410 can be ignored.

First, as shown in FIG. 2B, consider a case in which an emitted light component E1 from the end of the display portion 101 is emitted from the main surface 103 of the display device 100 at an angle θ1 with respect to a normal V of the main surface 103 of the display device 100. The direction of the normal V is parallel to the z direction in this case. The component E1 hits the side 203 of the overlap portion 220 and is specularly reflected upward (in the direction of the eyepiece optical system 20). In a case in which the side surface 202 (inner edge) of the overlap portion 220 includes a surface parallel to the z direction as shown in FIG. 2B, the side 203 of the overlap portion 220 will indicate a point on the inner edge of the overlap portion 220 which is farthest from the display device 100 in the z direction. In this case, assume that a component E2 is an emitted light component specularly reflected by the side 203 of the overlap portion 220. The component E2 has an angle θ2=(90−θ1) with respect to the x direction perpendicular to the z direction and enters the eyepiece optical system 20. When the component E2 passes the portion 401 of the lens 410, the emitted light component E2 will propagate to the side of the observer, and the side 203 of the overlap portion 220 will shine and be visually recognized by the observer. On the other hand, if it is designed so the component E2 will enter the light shielding portion 430 (in other words, the portion 402 of the lens 410), the side 203 of the overlap portion 220 will not shine and be visually recognized by the observer. As shown in FIG. 2B, assume that X [mm] is a length from the outer edge of the display portion 101 to the side 203 in an orthogonal projection with respect to the main surface 103 of the display device 100. In other words, assume that X [mm] is a length, parallel to the x direction, from the end of the display portion 101 to the side 203 of the overlap portion 220. The reflection on the side 203 of the overlap portion 220 can be suppressed by increasing the value of the length X to set the overlap portion 220 to be sufficiently apart from the display portion 101. However, if the value of X is increased, there is a possibility that the display quality of the electronic viewfinder 700 will degrade since the external light reflection of the circuit elements and the wiring of the peripheral portion 102 can increase. Hence, the value of X needs to be set to an appropriate value.

Y, L, and H which are lengths other than the length X shown in FIGS. 2A and 2B are defined as follows. The length Y [mm] is a length (height) from the main surface 103 of the display device 100 to the side 203 of the overlap portion 220 in the normal direction (z direction) with respect to the main surface 103 of the display device 100. The length L [mm] is a length from the side 203 of the overlap portion 220 to a side 403 which is arranged at a position, of the inner edge of the light shielding portion 430, facing the side 203 of the overlap portion 220 via the center of the display portion 101, in an orthogonal projection with respect to the main surface 103 of the display device 100. In a case in which the light shielding portion 430 is arranged at a position higher than the lens 410 as shown in FIG. 2A, the side 403 can be the side on the lower side of the inner edge of the light shielding portion 430. Also, in a case in which the light shielding portion 430 is arranged at a position lower than the lens 410, the side 403 can be the side on the upper side of the inner edge of the light shielding portion 430. The length H [mm] is a length (height) from the side 203 of the overlap portion 220 to the side 403 of the light shielding portion 430 in the normal direction with respect to the main surface 103 of the display device 100.

In this embodiment, the minimum necessary value of the length X can be calculated as follows by considering the relationships between X, Y, L, and H. In the case in which the display element 110 is an organic electroluminescent display element, although the distribution of the angle of emergence will change depending on the structure of the light-emitting element using organic electroluminescence, the display element 110 tends to be designed so that the luminance (emitted light intensity) of the front surface (in the direction of the normal V) will be strongest. Also, considering the entrapment of light from the light-emitting layer to the surface (main surface 103) of the display device 100 caused by total internal reflection at an interface such as the sealing layer, the luminance of light emitted from the display element 110 generally decreases as the angle $\theta 1$ from the normal V increases. In particular, in a method, as used in an electronic viewfinder, in which a display image is observed through the eyepiece optical system 20 facing the display message, the display device 100 is rarely observed from a horizontal direction. Hence, the display element 110 can be designed so that the component of light emitted from an angle from the normal V which is larger than a predetermined angle will decrease. More specifically, for example, it is designed so that this predetermined angle is set at 45°, and the ratio of an emitted light component which has an angle $\theta 1 \geq 45°$ will be very small compared to the ratio of an emitted light component which has an angle $\theta 1 \leq 45°$. Hence, importance can be placed on the emitted light component of the angle $\theta 1 \leq 45°$ which has a large ratio, and the value of X can be set first so the emitted light component E1 from the angle $\theta 1 \leq 45°$ will not enter the overlap portion 220. That is, it is designed so that, of the light beams emitted from the end of the display portion 101, a light beam that has angle less than a predetermined angle (for example, less than 45°) from the normal of the main surface 103 of the display device 100 will enter the lens 410 of the eyepiece optical system 20 without entering the overlap portion 220 (the side 203 and the side surface 202). In addition, it can be seen that a light beam of the angle $\theta 1 = 45°$ will enter the side 203 of the overlap portion 220 if X=Y, and that at least a light beam of the angle $\theta 1 < 45°$ can be suppressed from entering the overlap portion 220 if X≥Y. In this case, although the "predetermined angle", which is set in consideration of the entrapment of light emitted from the display element 110, is described as 45° from the normal V, the present invention is not limited to this. For example, the "predetermined angle" may fall within the range of 30° to 60° and may be appropriately selected in accordance with the specifications of the display device 100, the eyepiece optical system 20, or the like.

Next, the emitted light component having the angle $\theta 1 \geq 45°$ with a small ratio is $\theta 2 \leq 45°$, and the component E2 which has a reflection angle of $\theta 2 \leq 45°$ will enter the light shielding portion 430 by setting H≥L. That is, of the light beams emitted from the display portion 101, a light beam which has an angle equal to or more than a predetermine angle (for example, 45° or more) from the normal of the main surface 103 of the display device 100 and is reflected by the overlap portion 220 (the side 203 and the side surface 202) will enter the light shielding portion 430 of the eyepiece optical system 20. Hence, visual recognition of the reflection on the side 203 of the overlap portion 220 by the observer can be suppressed. As described above, by setting the values so that X≥Y and H≥L, visual recognition of the reflection of all of the emitted light components of angles 0°≤$\theta 1$≤90° on the side 203 of the overlap portion 220 by the observer can be suppressed. The side 203 of the overlap portion 220 has been described as the farthest point, on the inner edge of the overlap portion 220, from the display device 100 in the z direction because the farthest point, on the inner edge of the overlap portion 220, from the display device 100 in the z direction is where the angle $\theta 1$ of incidence of the emitted light component E1 becomes small. Hence, it is highly possible that a light beam with the small angle $\theta 1$ will enter, and the light beam reflected by the side 203 of the overlap portion 220 may easily enter the portion 401 of the lens 410 for transmitting light of the eyepiece optical system 20.

As described above, the overlap portion 220 is arranged to be apart from the outer edge of the display portion 101 by the length X. Hence, the region, of the peripheral portion 102, which is the length X from the outer edge of the display portion 101 will be in a state not covered by the overlap portion 220. To suppress display quality degradation of the electronic viewfinder 700 caused by external light reflection on the peripheral portion 102, a reflection suppression layer 104 may cover a portion, of the peripheral portion 102, where the overlap portion 220 does not overlap in an orthogonal projection with respect to the main surface 103 of the display device 100. In the reflection suppression layer 104, for example, a color filter layer 105 arranged on the display portion 101 may be arranged up to the peripheral portion 102. The reflection suppression layer 104 may include a multi-color arrangement pattern which is the same as the color filter layer 105 arranged on the display portion 101 or may be a solid color pattern using one of the colors of the color filter layer 105. That is, the reflection suppression layer 104 may include a layer made of the same material as the color filter(s) arranged in the color filter layer 105. The reflection suppression layer 104 may also be formed by using a material different from the color filter layer 105.

A case in which the outermost surface of the display device 100 is arranged with a protection layer 120, such as a glass plate or a plastic plate, having a film thickness (of about 50 µm or more) that cannot be optically ignored will be described next with reference to FIGS. 3A and 3B.

Figure 3A:
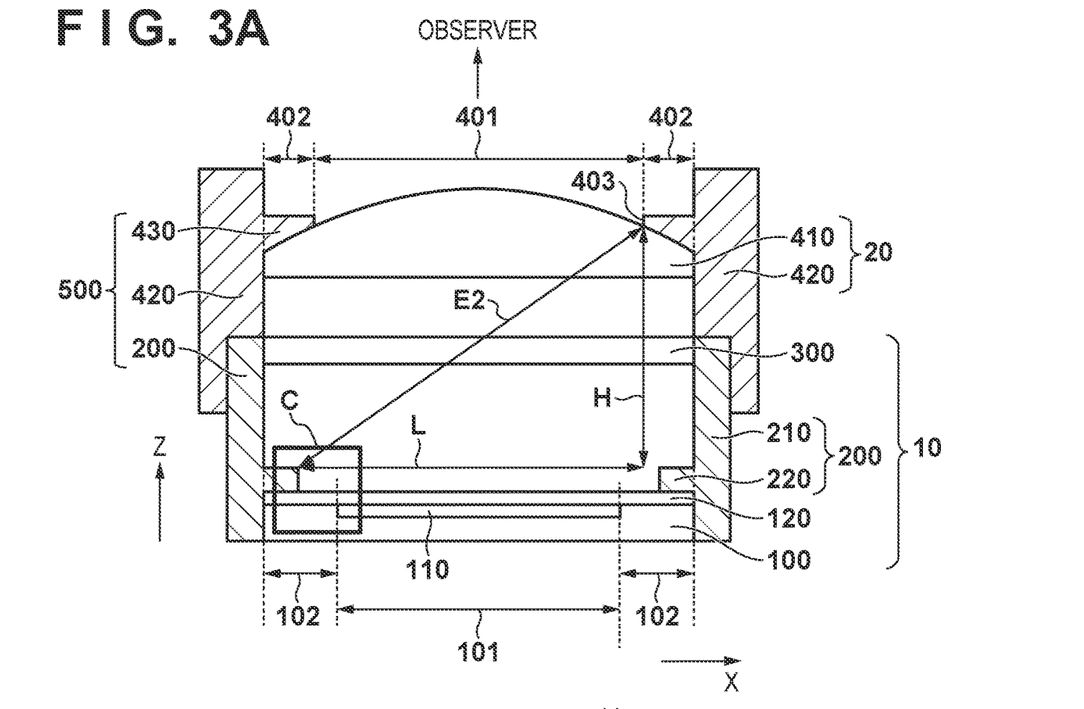
FIGS. 3A and 3B are views showing a modification of the electronic viewfinder shown in FIGS. 1A and 1B.
Figure 3B:
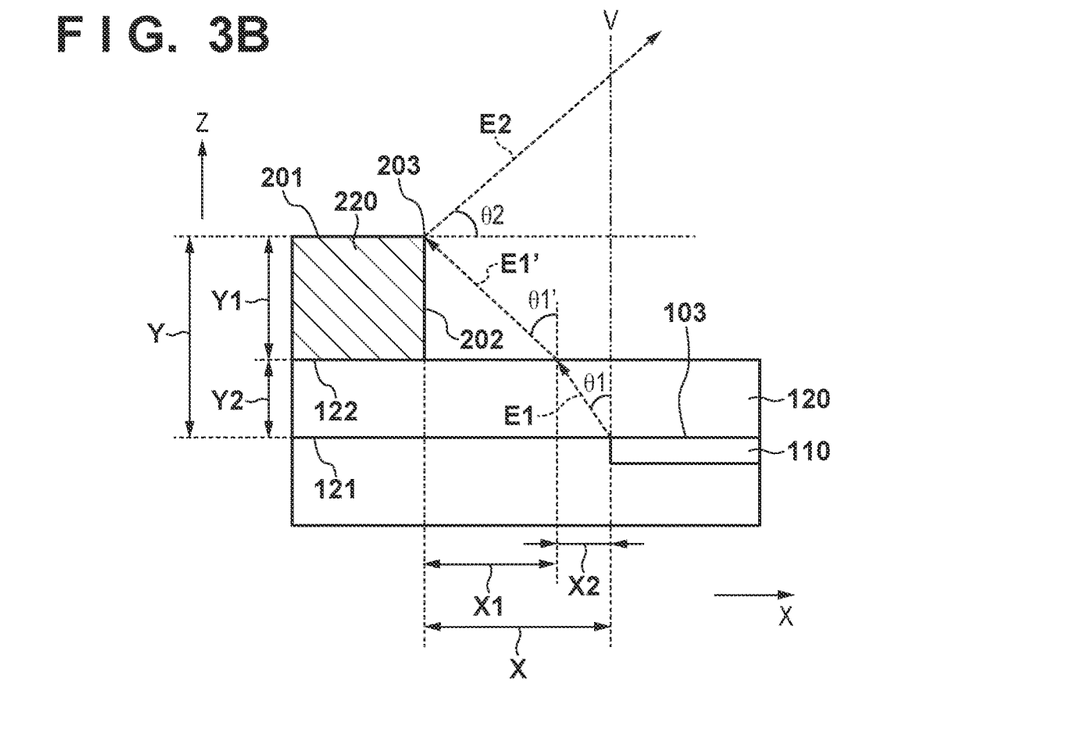

As shown in FIG. 3A, the protection layer 120 is arranged on the display device 100 with the display element 110 sandwiched between them. The protection layer 120 can be removed from portions such as the external connection terminal and the like (not shown) of the peripheral portion 102. FIG. 3B shows an enlarged view of a region C shown in FIG. 3A. As shown in FIG. 3B, assume that, in the normal direction (z direction with respect to the main surface 103 of the display device 100, a length (height) from an upper surface 122 on a side opposite to a lower surface 121 facing the main surface 103 of the protection layer 120 to the side 203 of the overlap portion 220 is Y1 [mm], and the thickness of the protection layer 120 is Y2 [mm]. Assume that n (n>1) is a refractive index of the protection layer 120. In this case, the component E1 of the emitted light from the end of the display portion 101, that is, the light entering the interface (that is, the upper surface 122 of the protection layer 120) between the air and the protection layer 120 at the angle θ1 with respect to the normal V of the main surface 103 of the display device 100 is refracted based on a relationship a refraction angle θ1'≥the angle θ1 of incidence by the refractive index difference between the air and the protection layer 120. Letting a component E1' be a component of the light refracted and emitted in the air, the component E1' enters, as shown in FIG. 3B, the side 203 of the overlap portion 220 at the angle θ1' and is specularly reflected upward (in the direction of the eyepiece optical system 20) at the reflection angle θ2=(90−θ1'). In this case, by arranging the respective relationships by using the X, Y, Y1, Y2, L, H, θ1'=90−arctan (H/L) is obtained from θ2=arctan(H/L).

On the other hand, based on Snell's law, the angle θ1 of the emitted light component E1 and the angle θ1' of the emitted light component E1' are $$\sin\theta 2 / \sin\theta 1 = n \text{ and can be expressed as}$$

$$\theta 1 = \arcsin\{(\sin\theta 2)/n\}$$

$$= \arcsin[\sin\{90 - \arctan(H/L)\}/n]$$

In this case, of the length X described above, letting X2 [mm] be a length by which the light is transmitted through the protection layer 120 and X1 [mm] be a length by which the light is transmitted through the air, $$X2/Y2 = \tan\theta 1$$

$$= \tan[\arcsin[\sin\{90 - \arctan(H/L)\}/n]]$$

$$X1/Y1 = \tan\theta 2$$

$$= \tan\{90 - \arctan(H/L)\}$$

and $$X = X1 + X2$$

$$= Y1\tan\{90 - \arctan(H/L)\} + Y2\tan[\arcsin[\sin\{90 - \arctan(H/L)\}/n]]$$

Hence, by setting X, Y1, H, and L to satisfy the relationship $$X \geq Y1 \tan\{90 - \arctan(H/L)\} + Y2 \tan[\arcsin[\sin\{90 - \arctan(H/L)\}/n]]$$

in accordance with the refractive index n and the thickness Y2 which is the film thickness of the protection layer 120, the light reflected by the overlap portion 220 (the side 203 and the side surface 202) is suppressed from passing the portion 401 for transmitting the light of the lens 410 and enters the light shielding portion 430. As a result, it is possible to prevent the observer from visually recognizing the light emitted from the display portion 101 and reflected by the inner edge of the overlap portion 220.

For example, consider a case in which a glass plate having the refractive index n=1.5 and the film thickness Y2=0.7 mm is used as the protection layer 120, and the lengths Y1 and L in the z direction from the surface 122 of the protection layer 120 to the side 203 of the overlap portion 220 are set to 0.5 mm and H, respectively. In this case, it is possible to derive that the display quality degradation of the electronic viewfinder 700 due to reflection on the side 203 of the overlap portion 220 can be suppressed by obtaining X≥0.874 mm from the above equations.

Figure 4:
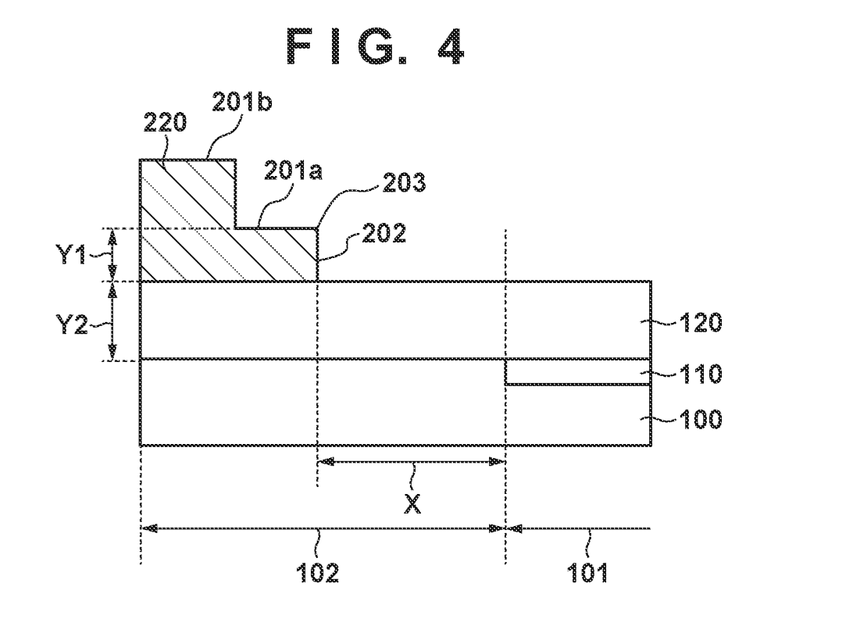
FIG. 4 is a sectional view showing a modification of an overlap portion of the electronic viewfinder of FIGS. 1A and 1B.

In general, the value of the length L, which depends on the size of the display device 100, and the value of the length H, which depends on the optical performance of the lens 410, are hard to change because of design restrictions. Hence, by fixing the values of L and H, the value of X can be reduced by reducing the values of Y1 (which depends on the thickness of the overlap portion 220) and Y2 (which depends on the thickness of the protection layer 120) as can be understood from the equations described above. If the overlap portion 220 is made thinner overall to reduce the value of Y1, the rigidity of the overlap portion 220 will be insufficient, and the overlap portion 220 may become deformed when the display device 100 is to contact the overlap portion 220. Hence, as shown in FIG. 4, an upper surface 201', of the overlap portion 220, on a side opposite to a surface facing the display device 100 can have a stepped shape in which its distance from the surface can increase stepwise as the distance from the display portion 101 increases. In this case, as shown in FIG. 4, of the stepped shape, the step formed by the side surface 202 of the inner edge of the overlap portion 220 may be smaller than other steps in the normal direction (z direction) with respect to the main surface 103 of the display device 100. By arranging the inner edge of the overlap portion 220 to have a stepped shape with a small thickness, the value of X can be reduced while ensuring the rigidity of the overlap portion 220 overall. Hence, the display quality degradation of the electronic viewfinder 700 due to external light reflection of the peripheral portion 102 can be suppressed.

Figure 5:
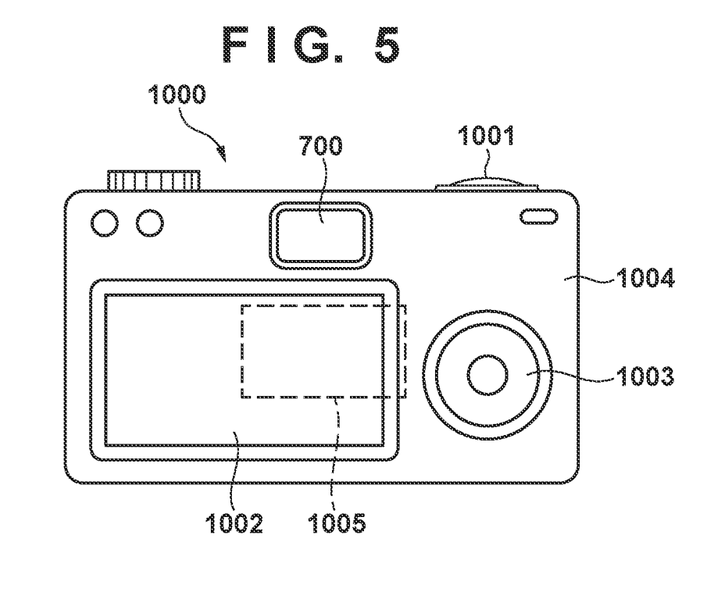
FIG. 5 is a view showing an example of the arrangement of an image capturing apparatus using the electronic viewfinder shown in FIGS. 1A and 1B.

FIG. 5 is a schematic view showing an example of an image capturing apparatus that includes the electronic viewfinder 700 according to this embodiment. An image capturing apparatus 1000 which is a camera includes the electronic viewfinder 700 described above, a shutter button 1001, a back display 1002, an operation portion 1003, and an exterior member 1004. The display portion 101 of the electronic viewfinder 700 may display not only an image to be captured, but also environment information, image capturing instructions, and the like. The environment information may be pieces of information such as the intensity of external light, the direction of external light, the speed of the movement of an object, the possibility of the object being blocked by an obstacle, and the like. Although the image capturing apparatus 1000 incorporating the electronic viewfinder 700 is exemplified in this embodiment, the electronic viewfinder 700 can be added externally to the image capturing apparatus 1000 in a detachable manner.

In addition, the image capturing apparatus 1000 includes an optical unit (not shown). This optical unit includes a plurality of lenses, and forms an image of light having passed through the optical unit on an image capturing element 1005 that is stored in the exterior member 1004 and receives the light. Although the optical unit can include a mirror that reflects the light transmitted through the lenses, the image capturing apparatus 1000 may be a mirrorless camera. The focal points of the plurality of lenses can be adjusted by adjusting the relative positions. This operation can also be performed automatically. The plurality of lenses may or may not be interchangeable lenses that can be attached to/detached from the image capturing apparatus 1000. An image captured by the image capturing element can be displayed on the display portion 101 of the electronic viewfinder 700. The electronic viewfinder 700 according to this embodiment can be used in a mirrorless interchangeable-lens camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-084432, filed Apr. 25, 2019, which is hereby incorporated by reference herein in its entirety.

What is claimed is:

1. A display apparatus comprising a display device which comprises a first surface including a display portion and a peripheral portion positioned surrounding the display portion, a lens facing the first surface, and a housing surrounding a space between the display device and the lens,
   wherein the housing comprises an overlap portion that overlaps at least a part of the peripheral portion in an orthogonal projection with respect to the first surface, and
   an inner edge of the overlap portion includes, in the orthogonal projection with respect to the first surface, a second surface arranged along a direction intersecting the first surface and a first side formed by the second surface and a third surface, of the overlap portion, on a side opposite to a surface facing the first surface, and
   the housing comprises a light shielding portion that overlaps at least a part of the peripheral portion in the orthogonal projection with respect to the first surface,
   a distance between the peripheral portion and the light shielding portion is larger than a distance between the peripheral portion and the overlap portion, and
   a light beam, of light beams emitted from an end of the display portion, which has an angle less than a predetermined angle from a normal of the first surface enters the lens without entering the overlap portion, and a light beam, of the light beams emitted from the end of the display portion, which has an angle not less than the predetermined angle from the normal of the first surface and is reflected by the overlap portion enters the light shielding portion.

2. The display apparatus according to claim 1, wherein $X \geq Y$ where $X$ [mm] is a length from an outer edge of the display portion to the first side in the orthogonal projection with respect to the first surface, and
   $Y$ [mm] is a length from the first surface to the first side in a normal direction with respect to the first surface.

3. The display apparatus according to claim 1, wherein $H \geq L$ where $L$ [mm] is a length from the first side to a second side which is arranged at a position, on the inner edge of the light shielding portion, facing the first side via the center of the display portion, and
   $H$ [mm] is a length from the first side to the second side in a normal direction with respect to the first surface.

4. The display apparatus according to claim 1, wherein the predetermined angle is 45°.

5. A display apparatus comprising a display device which comprises a first surface including a display portion and a peripheral portion positioned surrounding the display portion and a protection layer arranged so as to cover the first surface, a lens facing the first surface, and a housing surrounding a space between the display device and the lens,
   wherein the housing comprises an overlap portion that overlaps at least a part of the peripheral portion in an orthogonal projection with respect to the first surface, and
   an inner edge of the overlap portion includes, in the orthogonal projection with respect to the first surface, a second surface arranged along a direction intersecting the first surface and a first side formed by the second surface and a third surface, of the overlap portion, on a side opposite to a surface facing the first surface, and
   the housing comprises a light shielding portion that overlaps at least a part of the peripheral portion in the orthogonal projection with respect to the first surface,
   a distance between the peripheral portion and the light shielding portion is larger than a distance between the peripheral portion and the overlap portion, and $$X \geq Y1\,\tan\{90-\arctan(H/L)\}+Y2\,\tan[\arcsin[\sin\{90-\arctan(H/L)\}/n]]$$

where $X$ [mm] is a length from an outer edge of the display portion to the first side in the orthogonal projection with respect to the first surface, and $L$ [mm] is a length from the first side to a second side which is arranged at a position, on the inner edge of the light shielding portion, facing the first side via the center of the display portion, and
   $Y1$ [mm] is a length from a surface on a side opposite to a surface facing the first surface of the protection layer to the first side, $Y2$ [mm] is a thickness of the protection layer, and $H$ [mm] is a length from the first side to the second side, in a normal direction with respect to the first surface, and
   $n$ is a refractive index of the protection layer.

6. The display apparatus according to claim 1, wherein the second surface is parallel to a normal direction with respect to the first surface.

7. display apparatus according to claim 1, wherein the third surface is parallel to the first surface.

8. The display apparatus according to claim 1, wherein the housing holds a plurality of lenses arranged so as to overlap the display portion, and the light shielding portion is arranged near the lens, among the plurality of lenses, which is arranged at a position closest to the first surface.

9. The display apparatus according to claim 8, wherein the light shielding portion is arranged to be in contact with a surface on a side opposite to a surface facing the first surface of the lens which is arranged at the position closest to the first surface.

10. The display apparatus according to claim 8, wherein the light shielding portion is arranged so as to cover an outer edge portion of the lens which is arranged at the position closest to the first surface.

11. The display apparatus according to claim 1, wherein the third surface has a stepped shape in which the distance from the first surface increases stepwise as the distance from the display portion increases.

12. The display apparatus according to claim 11, wherein a step, of the stepped shape, which is formed by the second surface is smaller than the other steps in a normal direction with respect to the first surface.

13. The display apparatus according to claim 1, wherein a portion, of the peripheral portion, which does not overlap the overlap portion is covered by a reflection suppression layer in the orthogonal projection with respect to the first surface.

14. The display apparatus according to claim 13, wherein a color filter is arranged on the display portion, and
the reflection suppression layer includes a layer using the same material as the color filter.

15. The display apparatus according to claim 1, wherein the display device is an organic electroluminescent display device.

16. The display apparatus according to claim 1, wherein a light transmitting member is arranged, at an end on a side opposite to the side of the first surface of the housing, so as to cover the first surface in a normal direction with respect to the first surface.

17. The display apparatus according to claim 16, wherein the light transmitting member includes a fourth surface which faces the first surface and a fifth surface which is on a side opposite to the fourth surface and faces the lens, and
the fourth surface and the fifth surface are covered by an anti-reflection film.

18. The display apparatus according to claim 1, wherein at least a part of the overlap portion is arranged to be in contact with the first surface.

19. An image capturing apparatus comprising:
a display apparatus defined in claim 1; and
an image capturing element configured to capture an image to be displayed on the display apparatus.

* * * * *